United States Patent
Nakano (10) Patent No.: US 7,389,630 B2
(45) Date of Patent: Jun. 24, 2008

(54) PACKAGING DEVICE AND TRASH BOX

(75) Inventor: Yoichi Nakano, Chiyoda-ku (JP)

(73) Assignee: Kyoritsu Siyaku Corporation, Tokyo (JP)

( * ) Notice: Subject to any disclaimer, the term of this patent is extended or adjusted under 35 U.S.C. 154(b) by 101 days.

(21) Appl. No.: 10/568,640

(22) PCT Filed: Oct. 14, 2004

(86) PCT No.: PCT/JP2004/015560

§ 371 (c)(1),
(2), (4) Date: Feb. 16, 2006

(87) PCT Pub. No.: WO2005/037684

PCT Pub. Date: Apr. 28, 2005

(65) Prior Publication Data

US 2006/0283153 A1    Dec. 21, 2006

(30) Foreign Application Priority Data

Oct. 16, 2003    (JP) .............................. 2003-357061

(51) Int. Cl.
*B65B 9/02*    (2006.01)
(52) U.S. Cl. .............................. 53/553; 53/567; 53/570; 53/574
(58) Field of Classification Search .................. 53/553, 53/576, 567, 575, 570, 574, 459, 457, 468
See application file for complete search history.

(56) References Cited

U.S. PATENT DOCUMENTS

| | | | | |
|---|---|---|---|---|
| 3,321,103 A | * | 5/1967 | Phillips | ...................... 141/314 |
| 3,452,368 A | * | 7/1969 | Couper | ........................... 4/484 |
| 3,726,060 A | * | 4/1973 | McMillan | ................... 53/138.4 |
| 3,908,336 A | * | 9/1975 | Forslund | ....................... 53/576 |
| 4,067,173 A | * | 1/1978 | Borrello | ....................... 53/553 |
| 4,563,859 A | * | 1/1986 | Visser | .......................... 53/450 |
| 4,790,124 A | * | 12/1988 | Kaji | ............................. 53/552 |
| 4,869,049 A | | 9/1989 | Richards et al. | |
| 6,065,272 A | | 5/2000 | Lecomte | |

(Continued)

FOREIGN PATENT DOCUMENTS

JP    6011347    1/1985

(Continued)

OTHER PUBLICATIONS www.greenlife-web.co.jp.

*Primary Examiner*—Sameh H. Tawfik
(74) *Attorney, Agent, or Firm*—Wolf, Block, Schorr & Solis-Cohen LLP (57) ABSTRACT

The present invention automatically and continuously packs women's sanitary products, paper diapers, and the like in a sealed manner and is installed in toilets of hotels, public toilets, and the like used by general public.

When a trash is put in, film pull-out rollers (50), (60) are rotated by a motor (70) and films (31), (41) are pulled out from film feed rollers (30), (40). When passing between film pull-out rollers (50), (60), the trash is sealingly packed between the two films (31), (41). Therefore, since the trash can be automatically packed in a sealed manner and a clean state is maintained, the present invention is suitable for installation in toilets of hotels, public toilets, and the like used by general public.

8 Claims, 6 Drawing Sheets

U.S. PATENT DOCUMENTS

| | | | | |
|---|---|---|---|---|
| 6,128,890 | A * | 10/2000 | Firth | 53/567 |
| 6,386,850 | B1 * | 5/2002 | Salerno et al. | 425/112 |
| 7,013,622 | B2 * | 3/2006 | Berdelle-Hilge | 53/451 |

FOREIGN PATENT DOCUMENTS

| | | |
|---|---|---|
| JP | 39302 | 1/1991 |
| JP | 3-287929 | 12/1991 |
| JP | 743640 | 9/1995 |
| JP | 2543562 | 7/1996 |
| JP | 9301503 | 11/1997 |
| JP | 2586215 | 9/1998 |
| JP | 2586224 | 9/1998 |
| JP | 11124115 | 5/1999 |
| JP | 2000-247401 | 9/2000 |
| JP | 2000-515098 | 11/2000 |
| JP | 200268148 | 2/2002 |
| JP | 3287929 | 3/2002 |
| WO | WO 97/18992 | 5/1997 |

* cited by examiner

PACKAGING DEVICE AND TRASH BOX

TECHNICAL FIELD

The present invention relates to an art of a packaging device and a trash box using the packaging device.

BACKGROUND ART

A trash box described in, for example, a non-patent document 1 works in a mechanism such that a cylindrical bag is held in a cassette in the trash box, trashes are pushed down by a hand to a position lower than an arrangement position of a heater, and a lever disposed outside the trash box is manually operated so that the heater melts the bag by its heat, thereby sealingly packing the trashes such as paper diapers and sanitary products one by one separately. Such a trash box has advantages that there is little smell leakage and the trashes in the trash box can be finally disposed of in a sanitary manner since the trashes are sealingly packed one by one.

[Non-patent Document 1] http://www.greenlife-web.co.jp, home page of Green Life, "ELECTRICAL SMELL SEAL-IN TRASH BOX"

[Patent Document 1] Japanese Patent Application Laid-open No. 2000-247401

[Patent Document 2] Japanese Utility Model Registration No. 2586224

[Patent Document 3] Japanese Utility Model Registration No. 2586215

[Patent Document 4] Japanese Patent No. 2543562

[Patent Document 5] Japanese Patent No. 3287929

[Patent Document 6] Japanese Utility Model Application Laid-open No. Hei 3-9302

However, the trash box described in the non-patent document 1 has the following problem. Firstly, in order for the trash to be sealingly packed in the bag, the trash has to be pushed down by a hand to the position lower than the arrangement position of the heater, which is troublesome. In addition, manual work of operating the lever disposed outside the trash box is necessary for packing the trashes one by one after the trashes are pushed down by a hand, which needs a lot of trouble. Naturally, with the increase in amount of the trashes, a work volume accordingly increases, which cannot be said to be efficient.

Further, for home use, a user does not feel it unsanitary to push the trash and manually operate the lever as described above, but if the trash box is installed in toilets of hotels, public toilets of stations, and the like, it is highly possible that a user gets an unsanitary feeling and avoids these works. Therefore, the trash box described above is not suited for public toilets and the like used by general public.

Further, the patent documents 1 to 5 disclose arts in which a film formed in a cylindrical shape in advance is used and each trash is sealingly packed by twisting film portions positioned between adjacent trashes. However, similarly to that in the non-patent document 1, these trash boxes also require the work of pushing down trashes one by one, which is troublesome.

On the other hand, the patent document 6 discloses a sanitary container in which a trash is put between films fed from film feed rollers facing each other and operation sticks are used to bring the films into close contact with each other in portions ahead of and behind the trash. However, the patent document 6 does not disclose any means for bringing side edges of the films into close contact with each other. The two operation sticks disclosed in the patent document 6 cannot bring the side edges of the two films facing each other into close contact with each other while sandwiching a trash. In order to prevent smell leakage, trash boxes of this type use films for sealingly packing trashes, but that disclosed in the patent document 6 cannot prevent the smell leakage.

Moreover, in all of the non-patent document 1 and the patent documents 1 to 5, the trash is sealingly packed only by bringing the film portions positioned around the trash into close contact with each other, so that air remains between the trash and the films when the trash is stored in the trash storage part. If the air remains therebetween, an amount of trashes stored in the trash storage part accordingly reduces, which poses a problem in terms of efficiency of a trash storage amount and increases maintenance frequency.

The present invention was made in view of the above circumstances, and its object is to provide a packaging device and a trash box using the packaging device which is not only capable of disposing of women's sanitary products and paper diapers in a sealed manner but also capable of sealingly packing them automatically, and which includes a deaeration function of bringing films into close contact with a surface of an object for disposal, so that even though the object for disposal is packed by the film, a storage amount of the objects for disposal is not reduced, compared with a case where the object for disposal does not undergo packing processing by a film, and more particularly, which is suitable for installation in toilets of hotels and public toilets of parks, stations, and the like used by general public.

DISCLOSURE OF THE INVENTION

In order to attain the objects stated above, the present invention in one embodiment provides a packaging device including two film feed rollers rotatably arranged in parallel and a predetermined interval apart from each other, and including:

two film pull-out rollers which rotate to pull out films from the respective film feed rollers and are arranged in parallel with circumferential surfaces being in contact with each other via the pulled films in a normal state; and a driving part rotating the film pull-out rollers, wherein an object for disposal is received between the film feed rollers, the driving part rotates the film pull-out rollers, and the object for disposal passes between the film pull-out rollers, thereby allowing the object for disposal to be sealingly packed between the films, and wherein at least one of the film pull-out rollers includes a circumferential surface that is elastically deformed by the object for disposal when the object for disposal passes between the film pull-out rollers, whereby the object for disposal is allowed to be sealingly packed while the films are into close contact with a surface of the object for disposal.

The present invention according to another embodiment provides a packaging device wherein, when the object for disposal passes between the film pull-out rollers, the films come into close contact with each other in respective side edges positioned on both sides of the object for disposal and in positions ahead of and behind the object for disposal in a film moving direction.

The present invention according to another embodiment provides a packaging device wherein the driving parts are provided in correspondence to the film pull-out rollers respectively, and the film pull-out rollers are rotary driven together by the respective driving parts.

The present invention according to another embodiment provides a packaging device wherein at least the one film pull-out roller including the circumferential surface that elastically deforms in accordance with the passage of the object for disposal includes sponge or rubber supported by a rotary shaft.

The present invention according to another embodiment provides a packaging device wherein, in the normal state, the film pull-out rollers are biased by an elastic member in approaching directions, and when a load with a predetermined magnitude or larger works in a direction so as to make the film pull-out rollers apart from each other, at least one of the film pull-out rollers becomes apart from the other.

The present invention according to another embodiment provides a packaging device wherein the film rolled around at least one of the film feed rollers is an adhesive film having an adhesive layer formed in at least side edges thereof.

The present invention according to another embodiment provides a packaging device wherein the films rolled around the respective film feed rollers are plastic films that come into close contact with each other by an electrostatic action when the films pass between the film pull-out rollers.

The present invention according to another embodiment provides a packaging device wherein the one film pull-out roller includes heater parts which are provided on circumferential surfaces of both longitudinal end portions thereof to heat-seal the films passing between the film pull-out rollers.

The present invention according to another embodiment provides a packaging device wherein the film pull-out roller further includes a linear heater part which is formed along the longitudinal direction of the film pull-out roller and through which the heater parts formed on the circumferential surfaces of the both longitudinal end portions communicate with each other.

The present invention according to another embodiment provides a packaging device including a detecting means for detecting whether or not the object for disposal is positioned between the pulled films in a space between the film feed rollers and the film pull-out rollers, wherein, when detecting the object for disposal, the detecting means outputs a driving signal to the driving part rotating the film pull-out rollers.

The present invention according to another embodiment provides a packaging device being disposed on an upper side of a trash storage part, wherein a trash as the object for disposal passes between the film pull-out rollers, thereby allowing the trash to be sealingly packed between the films and to be stored in the trash storage part.

The present invention according to another embodiment provides a trash box including a trash storage part storing a trash, wherein a packaging device is disposed on an upper side of the trash storage part, whereby the trash as an object for disposal which is put in from an inlet provided in the packaging device is allowed to be sealingly packed between the films and to be stored in the trash storage part.

The present invention according to another embodiment provides a trash box wherein a width of the trash storage part along a longitudinal direction of the film feed rollers is substantially equal to a width of the films fed from the film feed rollers.

The present invention according to another embodiment provides a trash box wherein the packaging device and the trash storage part are provided in plurality.

The present invention according to another embodiment provides a trash box wherein the packaging device has a plurality of inlets, and the film feed rollers and the film pull-out rollers are provided in correspondence to each of the inlets.

EFFECTS OF THE INVENTION

The present invention is structured such that the two films are pulled out from the two film feed rollers by the rotation of the film pull-out rollers and the object for disposal is sealingly packed between the two films. Therefore, it is possible to continuously pack the object for disposal in the sealed manner by utilizing films with a predetermined length, which is suitable for sealingly packing a large number of the objects for disposal. In addition, the circumferential surface of at least one of the film pull-out rollers elastically deforms when the object for disposal passes therebetween. Therefore, even though the two film pull-out rollers are disposed in parallel with the circumferential surfaces thereof being in contact with each other via the pulled films in the normal state, the object for disposal is allowed to pass between the two film pull-out rollers, which ensures that portions around the object for disposal are in close contact therewith and can prevent smell leakage to the outside, and therefore, the packaging device of the present invention is suitable for application to the trash box. In particular, trashes which are put in can be automatically and continuously packed in a sealed manner only by rotary driving the film pull-out rollers, which gives a sanitary feeling (a clean image) to a user and thus the trash box is suitable for installation in toilets of hotels, public toilets, and the like used by general public.

Further, since at least one of the film pull-out rollers elastically deforms when the object for disposal passes therebetween, it is possible to press the film against the surface of the object for disposal by its elasticity to compress the object for disposal, which enables the deaeration of the air between the films simultaneously with the sealingly packing, so that air mixture can be reduced and the size of the trash can be made small. Therefore, when the object for disposal is stored in the trash storage part, a reduction in a storage amount ascribable to the air is prevented.

Moreover, if the driving parts are coupled to the respective film pull-out rollers to rotary drive both of the rollers, their forces of pulling the object for disposal can be increased, which can ensure a smoother rotation operation. Further, owing to the increase in the pulling forces, when a new object for disposal sealingly packed by the films is stored, it is pushed against the object for disposal already stored in the trash storage part. As a result, even covering the trashes with the films causes substantially no reduction in the storage amount of the trash storage part, but rather increases storage efficiency.

Further, when the trash storage part is formed such that the width of the storage part along the longitudinal direction of the film feed rollers is substantially equal to, namely, equal to or slightly larger than, the width of the films fed from the film feed rollers, the objects for disposal sealingly packed by the films are stored in the trash storage part in a folded manner, which results in further increased trash storage efficiency.

BEST MODE FOR CARRYING OUT THE INVENTION

Hereinafter, the present invention will be described in more detail based on embodiments of the present invention shown in the drawings.

Figure 1:
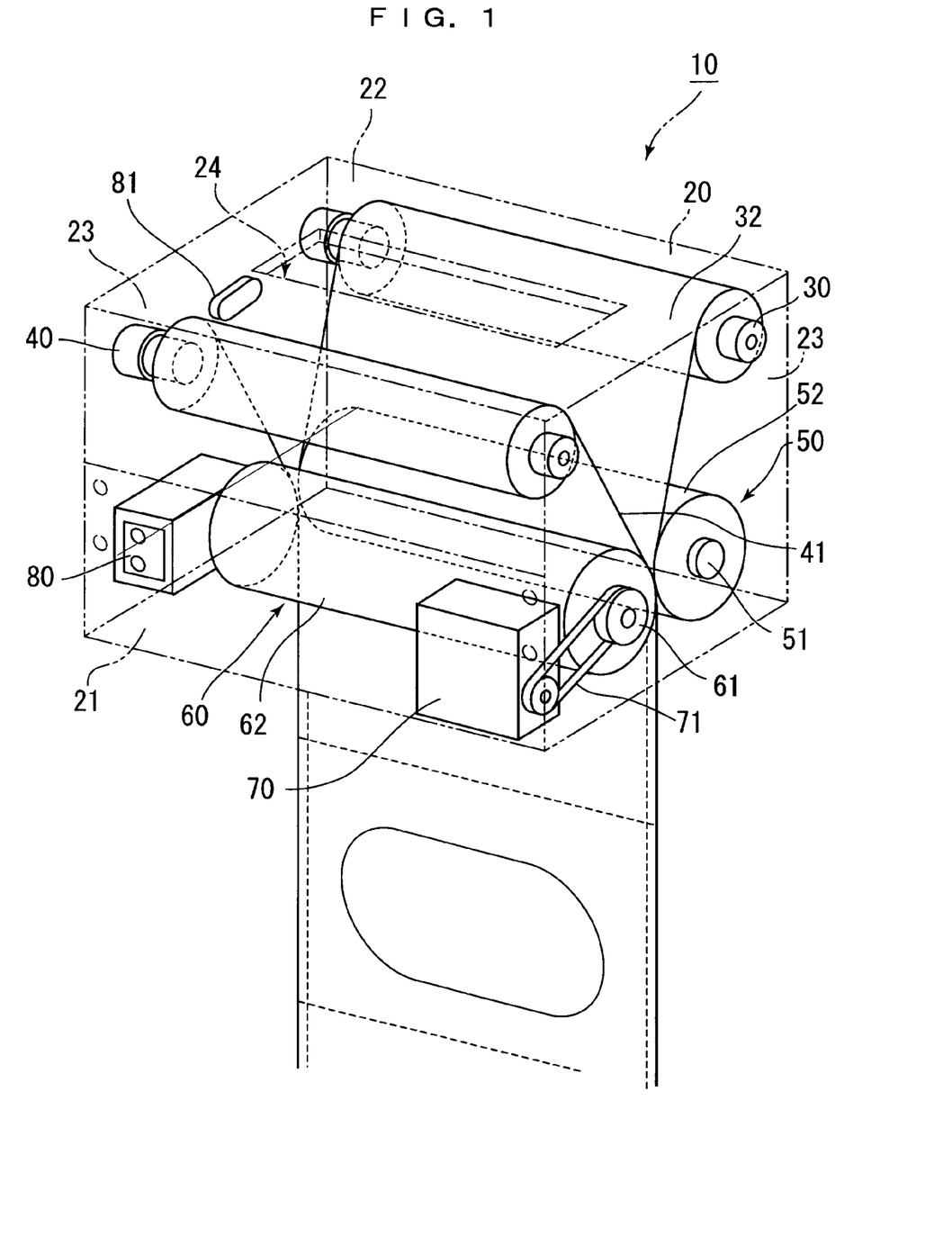
FIG. 1 is a perspective view showing a structure of a packaging device according to one embodiment of the present invention.
Figure 2:
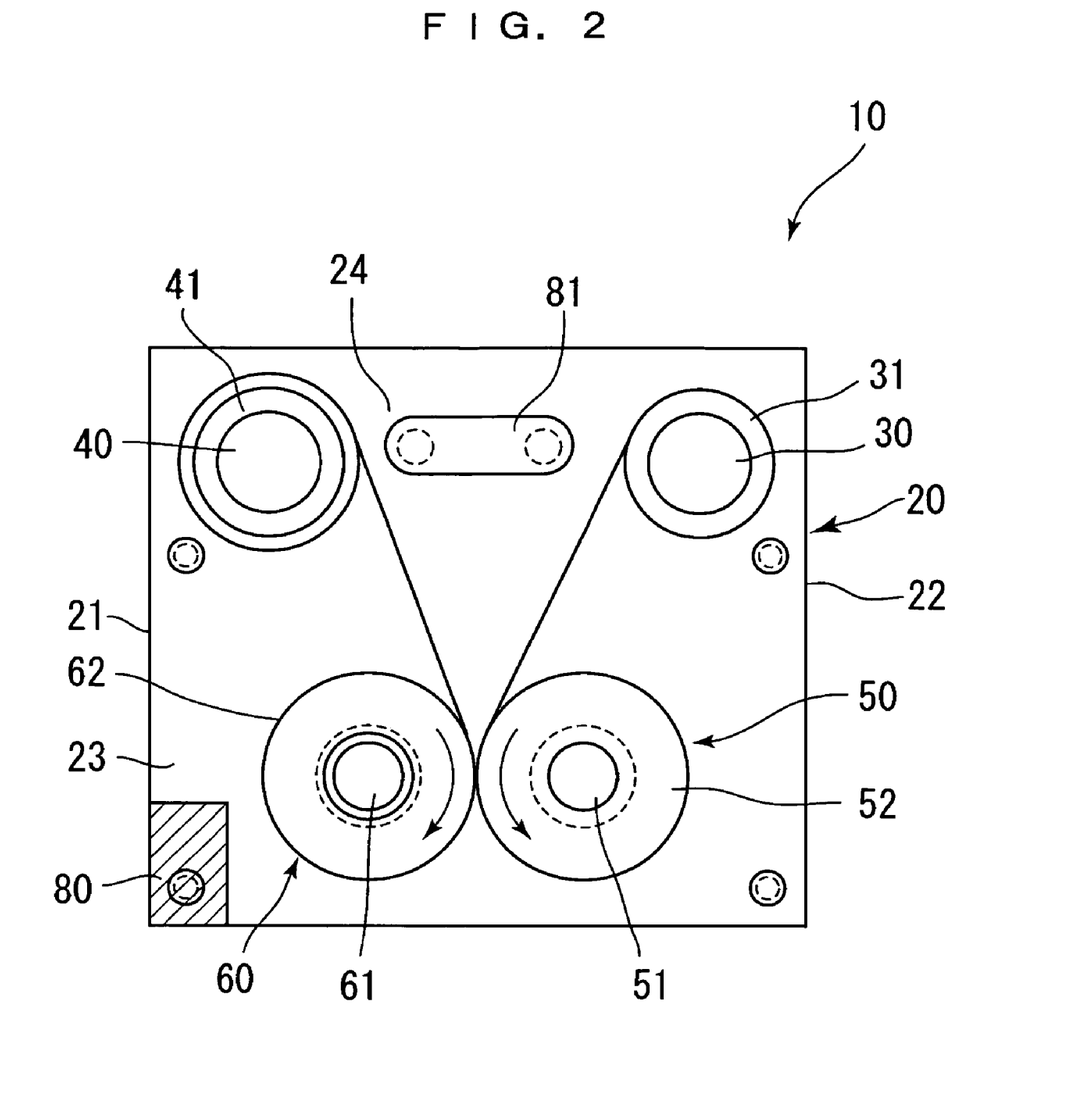
FIG. 2 is a side view showing the structure of the packaging device according to the embodiment of the present invention.

FIG. 1 is a perspective view showing a structure of a packaging device 10 according to one embodiment of the present invention, and FIG. 2 is a side view of the packaging device 10. As shown in these drawings, the packaging device 10 of this embodiment has a frame member 20, film feed rollers 30, 40, film pull-out rollers 50, 60, and a motor (driving part) 70.

Figure 3:
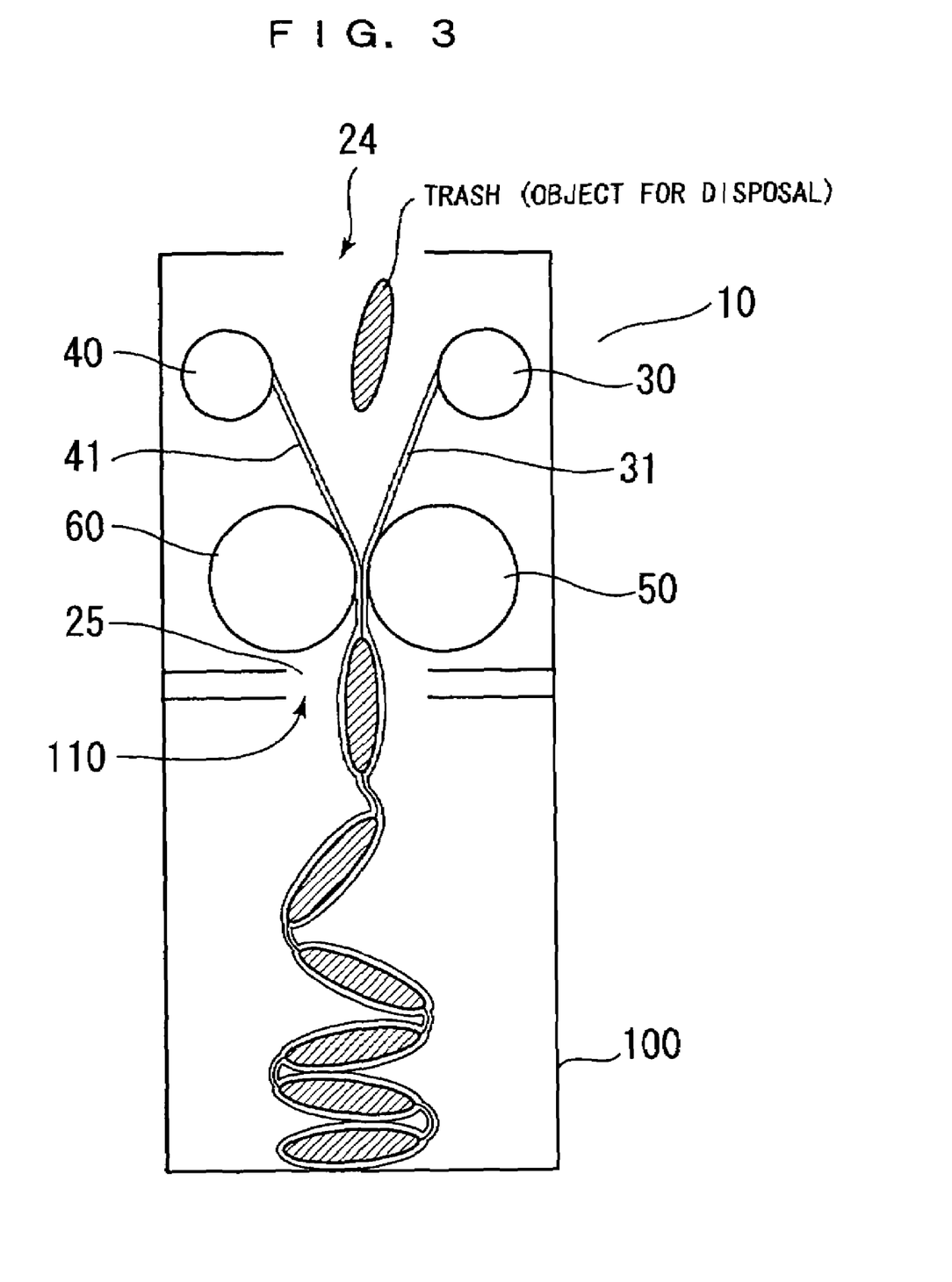
FIG. 3 is a schematic view showing a trash box using the packaging device according to the embodiment of the present invention.

The frame member 20 may be any, providing that it can rotatably support the film feed rollers 30, 40 and the film pull-out rollers 50, 60, and a structure and a shape thereof are not limited. As shown in FIG. 1, this embodiment uses the frame member 20 including a front panel part 21, a rear panel part 22, and two side panel parts 23, 23 facing each other, and the rollers 30 to 60 rotatably extending between the facing side panel parts 23, 23. Further, as shown in FIG. 3, when the packaging device 10 of this embodiment is applied to, for example, a trash box, the packaging device 10 is used in such a manner that a lower end opening part 25 thereof is detachably attached on an upper side of a trash storage part 100, with the lower end opening part 25 communicating with an upper end opening part 101 of the trash storage part 100. An inlet 24 is formed at an arbitrary position of the frame member 20, for example, in an upper surface thereof, and when a trash as an object for disposal is put in from the inlet 24, it is stored in the trash storage part 100 through the lower end opening part 25. A formation position and a structure of the inlet 24 are not limited, providing that the object for disposal can be sent therefrom to a gap between the film feed rollers 30, 40.

The film feed rollers 30, 40 extend between the side panel parts 23, 23 of the frame member 20 as described above, and are arranged in parallel to face each other and a predetermined distance apart from each other, so that the trash as the object for disposal can pass between the facing film feed rollers 30, 40. The film feed rollers 30, 40 feed films for sealingly packing the object for disposal put therebetween, and films 31, 41 with a predetermined length and a predetermined width are rolled therearound. The kind and material of the films 31, 41 are not limited, but since they sealingly pack the object for disposal while sandwiching it, they need to have a property of coming into close contact with each other when their film surfaces facing each other are joined together.

For example, plastic films may be used for realizing mutual close contact by an electrostatic action, or a film (adhesive film) having an adhesive layer at least on side edges may be used as at least one of the films 31, 41, preferably, as both of the films. The use of such an adhesive film can bring the films 31, 41 in closer contact with each other. In this embodiment, the adhesive films are used as the film 31 and the other film 41. Incidentally, providing the adhesive layer on, for example, at least the side edges of one of the films 31, 41 as described above makes it possible to sealingly pack the object for disposal therebetween. The adhesive layers in a line shape along the width direction may be arranged at predetermined intervals in a pulling direction (movement direction). This makes it possible to bring the films 31, 41 into close contact with each other in positions ahead of and behind the object for disposal in the pulling direction (movement direction), so that the objects for disposal can be more surely packed in a sealed manner one by one. Note that it is preferable to form the adhesive layer all over at least one of the facing surfaces or both of the facing surfaces of the films 31, 41 because the films can be more surely brought into close contact with the surface of the object for disposal irrespective of the size of the object for disposal.

The film pull-out rollers 50, 60 extend between the side panel parts 23 of the frame member 20 to be substantially parallel to the film feed rollers 30, 40 and to be apart from the film feed rollers 30, 40 in a direction in which the films 31, 41 are desired to be pulled out, that is, the film pull-out rollers 50, 60 in this embodiment extend substantially parallel to the film feed rollers 30, 40, being apart therefrom in a downward direction. The film pull-out rollers 50, 60 are arranged in parallel to face each other, with circumferential surfaces thereof being in contact with each other via the films 31, 41 passing therebetween. The film pull-out rollers 50, 60 sandwich the films 31, 41 and rotate in inward directions, that is, in the side view in FIG. 2, the film pull-out roller 50 rotates anticlockwise and the other film pull-out roller 60 rotates clockwise, thereby pulling out the films 31, 41 from the film feed rollers 30, 40 to make the films 31, 41 in close contact with each other.

The film pull-out rollers 50, 60 only need to exert such functions. However, the film pull-out rollers 50, 60 need to absorb the thickness of the object for disposal passing therebetween since they are arranged with the circumferential surfaces thereof being in close contact with each other in the normal state as described above. Therefore, as at least one of the film pull-out rollers 50, 60, it is necessary to use a roller whose circumferential surface elastically deforms in accordance with the passage of the object for disposal. In this embodiment, both of the film pull-out rollers 50, 60 are formed such that cylindrical members 52, 62 formed of sponge are fitted around rotary shafts 51, 61 thereof. Incidentally, as the cylindrical members 52, 62, not only the sponge but also rubber is usable. Such cylindrical members 52, 62 elastically deform in accordance with the passage of the object for disposal such as a trash and thus fit the surface shape of the trash or the like. Therefore, this elastic deformation makes it possible not only to compress the trash or the like to reduce its size, but also to improve storage efficiency in the trash storage part 100 since it is accompanied by the deaeration effect reducing an amount of air remaining between the films 31, 41.

Between at least one-side ends of the film pull-out rollers 50, 60, a spring (not shown) as an elastic member is hung to bias the both in approaching directions in the normal state. Therefore, when a load with a predetermined magnitude or larger works in a direction so as to make the film pull-out rollers 50, 60 apart from each other, for example, when a trash with a prescribed volume or larger is put in or when a large artificial force is applied, the both rollers 50, 60 become apart from each other, which can prevent overload to the motor 70 to reduce its trouble.

The motor 70 is disposed in a gap between the front panel part 21 and the other film pull-out roller 60 in the frame member 20. A driving belt 71 is hung between a rotation output part such as an output shaft, a gear, and the like of the motor 70 and the rotary shaft 61 of the other film pull-out roller 60, so that power of the motor 70 is transmitted to the other film pull-out roller 60. It should be noted that the arrangement position of the motor 70 is not limited, but the motor 70 may be disposed in a vacant space in the frame member 20. Further, depending on the arrangement position of the motor 70, the rotation output part of the motor 70 may be directly coupled to either of the film pull-out rollers 50, 60, not via the driving belt 71. A power source of the motor 70 may be any, and in this embodiment, a battery 80 is used. Incidentally, as the power source for driving the motor 70, power may be supplied from an outlet. However, the use of the battery 80 as the power source of the motor 70 allows the packaging device 10 to be used cordless when there is no outlet around its installation place and makes the packaging device 10 easy to carry.

Further, in FIG. 1, the motor 70 as the driving part is coupled only to the rotary shaft 61 of the other film pull-out roller 60, but it is preferable that another not-shown motor is provided to be coupled to the rotary shaft 51 of the film pull-out roller 50 so that the two film pull-out rollers 50, 60 are rotary driven in the inward directions by the two motors (driving parts) respectively. As a result, forces to pull out the films 31, 41 become stronger, so that the object for disposal can be more surely carried to the space between the film pull-out rollers 50, 60. Further, owing to the increased pulling forces, when an object for disposal newly sealingly packed between the films 31, 41 is moved out from the gap between the rollers 50, 60, it is stored in the trash storage part 100 so as to be pressed against the object for disposal already stored in the trash storage part 100. Therefore, storage efficiency of the trash storage part 100 can be further enhanced.

A driving switch of the motor 70 may be any, and in this embodiment, a detecting means 81 such as an optical sensor is provided on the side panel part 24. The detecting means 81 detects whether or not the trash as the object for disposal has passed between the film feed rollers 30, 40 to be positioned between the films 31, 41. When detecting the trash, the detecting means 81 outputs to the motor 70 a driving signal, which causes the film pull-out rollers 50, 60 to rotate. Further, as the detecting means, also usable is a weight sensor detecting whether or not the trash is placed on the film pull-out rollers 50, 60. By thus using the detecting means 81 such as an optical sensor, a user only needs to put the trash in and then the trash can be automatically disposed of, but another possible structure may be to provide a switch such as a push button and to operate the switch to drive the motor 70.

Next, an operation of the packaging device 10 according to this embodiment will be described. As shown in FIG. 3, when the packaging device 10 is applied to a trash box 110, it is placed on the trash storage part 100 with, for example, the lower end opening part 25 of the frame member 20 communicating with the upper end opening part 101 of the trash storage part 100. As initial setting, leading end portions of the films 31, 41 of the film feed rollers 30, 40 are interposed between the film pull-out rollers 50, 60 in advance.

When a trash is put in from the inlet 24 of the packaging device 10, the detecting means 81 such as an optical sensor detects the trash to output the driving signal to the motor 70. Upon receiving the driving signal, the motor 70 starts rotating. Then, the rotation of the motor 70 is transmitted from the driving belt 71 to the other film pull-out roller 60, which starts rotating together with the film pull-out roller 50 that is in contact therewith.

First, the leading end portions of the films 31, 41 are made in close contact with each other by the two film pull-out rollers 50, 60 to join together. The films 31, 41 are joined together in side edges thereof when passing between the film pull-out rollers 50. 60. In the meanwhile, the trash which is put in passes between the film pull-out rollers 50, 60, and at the time of this passage, since the cylindrical members 52, 62 of the film pull-out rollers 50, 60 elastically deform along the shape of the trash and press the trash while absorbing the thickness of the trash, the films 31, 41 are made in close contact with the periphery (surface) of the trash along with the deaeration. When the film pull-out rollers 50, 60 make one rotation or a predetermined times of the rotations to send the trash under the film pull-out rollers 50, 60, the films 31, 41 are directly joined together again by the film pull-out rollers 50, 60, owing to, for example, an electrostatic action or the adhesive layer.

As a result, the trash is stored in the storage part 100 while being sealingly packed by the films 31, 41. When a trash is put in again, the above-described operations are repeated, so that the trashes are sealingly packed in sequence. Therefore, smell leakage to the outside can be prevented. In this case, if the films 31, 41 are brought into close contact with each other only in the side edges instead of the leading end portions, smell leakage to the outside is also small since the film pull-out rollers 50, 60 are in contact with each other in the normal state. However, as describe above, it is preferable that positions ahead of and behind the trash in the movement direction are also in close contact with each other. Note that the motor 70 is set so as to stop at an instant after a predetermined time passes from, for example, the time the trash is no longer detected by the detecting means 81. Thus, this embodiment is structured such that the films 31, 41 having an arbitrary length are used and a trash is sealingly packed while the films 31, 41 are being pulled out, which enables automatic and continuous packing of trashes in a sealed manner, and therefore, this embodiment is suitable for installation in toilets and public toilets used by general public.

Disposal of trashes can be continued until all the films 31, 41 are consumed, but the films 31, 41 can be cut in the middle according to the storage amount of the trash storage part 100 for discarding.

Figure 4:
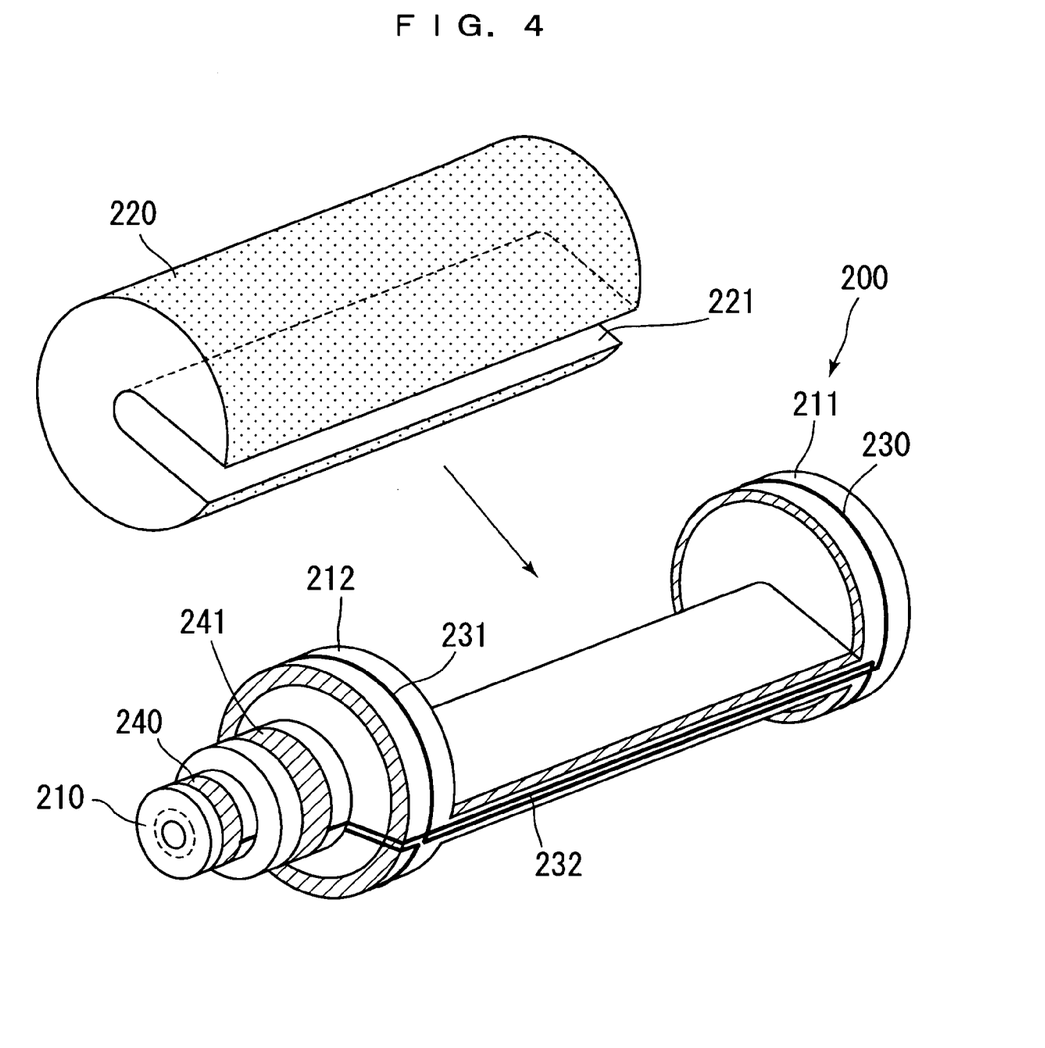
FIG. 4 is a view to illustrate a structure of a heater-equipped film pull-out roller.

It should be noted that the present invention is not limited to the above-described embodiment. The above description shows, as an example, the case where the films 31, 41 are brought into close contact with each other by an electrostatic action or adhesion, but an alternative possible structure is such that, as shown in FIG. 4, a heater-equipped film pull-out roller 200 is used as one of the film pull-out rollers to thereby heat-seal (thermally join) the films 31, 41 with each other. An example usable as the heater-equipped film pull-out roller 200 is one that includes: a rotary shaft 210 which has disk-shaped end wall portions 211, 212 at longitudinal both ends thereof; and a cylindrical member 220 fitted between the end wall portions 211, 212, and heater parts 230, 231 made of nichrome wire or the like are also provided on circumferential surfaces of the end wall portions 211, 212. With this structure, the side edges of the film 31, when coming into contact with the heater parts 230, 231, can be heat-sealed (thermally joined) to the side edges of the other film 41.

Further, preferably, as shown in FIG. 4, a linear heater part 232 is provided so as to make the heater parts 230, 231 formed at the longitudinal both ends communicate with each other and so as to face an outer surface from a cut-away portion 221 formed in the cylindrical member 220. This makes it possible to heat-seal (thermally join) the films 31, 41 linearly in a width direction by the linear heater part 232. Therefore, with this structure, one rotation of the film pull-out roller 200 can heat-seal (thermally join) the films in positions ahead of and behind the trash in the movement direction. Note that in the drawing, 240, 241 are ring electrodes and electric current is supplied to the heater parts 230, 231, 232 via the ring electrodes 240, 241.

Further, as described above, it is preferable that the cylindrical member 220 is made of sponge, rubber, or the like and its circumferential surface is elastically deformable. As described in the above embodiment, it is preferable that the films 31, 41 are brought into close contact with each other by the electrostatic action or adhesion because this structure does not require a power source for the heaters and enables lower cost manufacture.

Further, in the form shown in FIG. 3, one set of the packaging device 10 having the trash inlet 24 and the trash storage part 100 is used, but the both may be used in plurality.

Further, when the width of the trash storage part 100 along the longitudinal direction of the film feed rollers 30, 40 is substantially equal to, namely, equal to or slightly larger than, the width of the films 31, 41 fed from the film feed rollers 30, 40, side edges of the object for disposal sealingly packed by the films 31, 41 are restricted by inner walls of the trash storage part 100 when it is stored in the trash storage part 100, so that the fluctuation of the storage direction to right or left in the trash storage part 100 can be prevented and the trashes can be continuously stored in a folded manner. As a result, trash storage efficiency is more enhanced.

Figure 5:
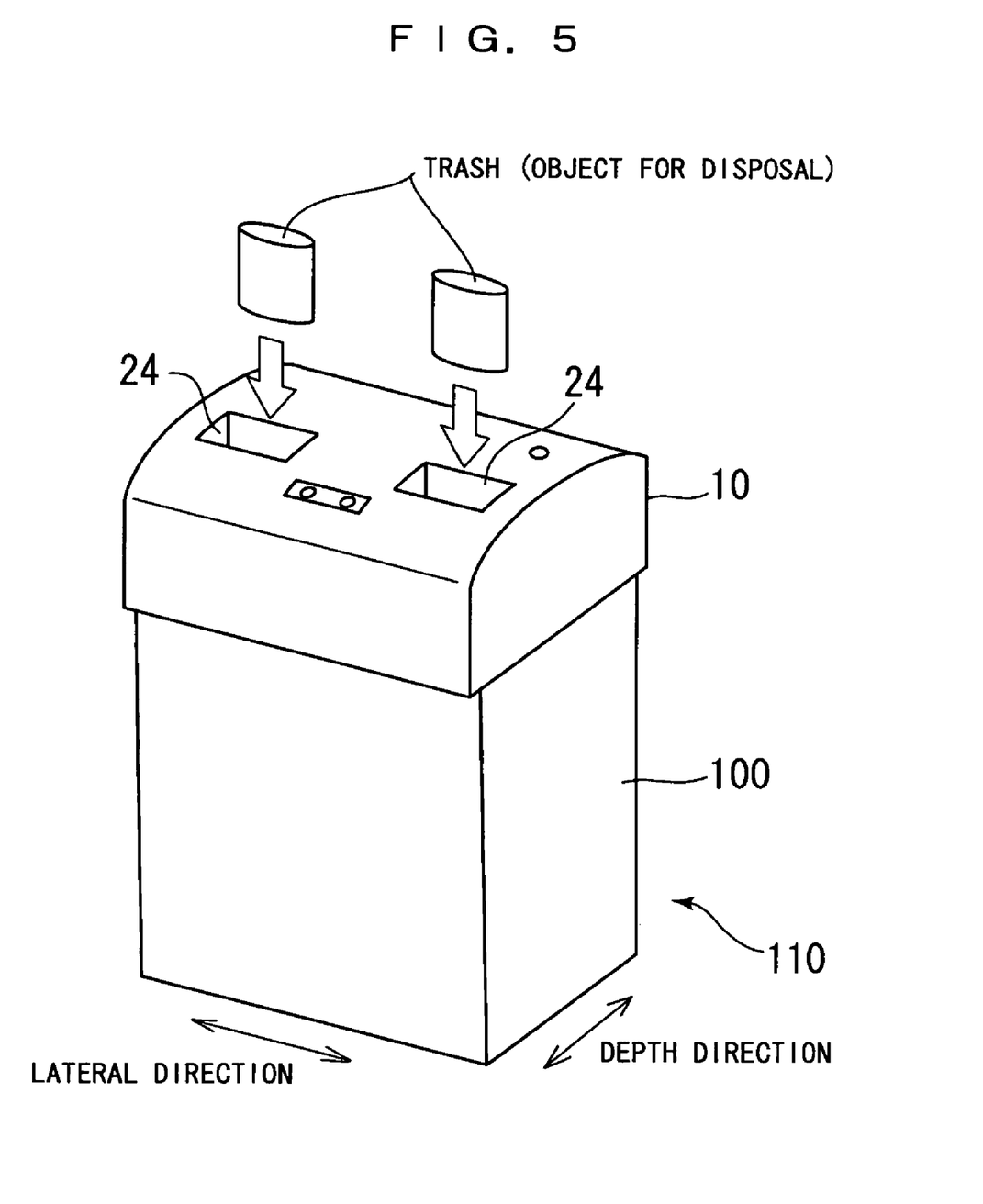
FIG. 5 is a view showing a trash box including a plurality of inlets.

Another possible example is such that, as shown in FIG. 5, the trash storage part 100 is formed to have a lateral width twice as large as the width of the object for disposal or larger, the packaging device 10 has two inlets 24 arranged in parallel, a partition wall (not shown) partitioning the inside of the trash storage part 100 into two rooms is provided, and the lateral width of each of the rooms is set substantially equal to the width of the films 31, 41, and in this case, the objects for disposal sealingly packed by the films 31, 41 are prevented from being displaced to right or left and thus the storage direction is stabilized, so that the trashes are stored continuously in a folded manner and storage efficiency is enhanced. A possible structure in this case is such that the film feed roller 30, the film feed roller 40, and the film pull-out roller 50, and the film pull-out roller 60 one each are provided along the width direction of the packaging device 10, and each of the film feed rollers 30, 40 holds in a longitudinal direction thereof two films (in a rolled form) corresponding to the respective rooms. However, this structure incurs waste because when a trash as an object for disposal is put in only from one of the inlets 24, the film corresponding to the other inlet 24 is also pulled out. Therefore, a preferable structure when the inlets 24 are provided at a plurality of places as shown in FIG. 5 is to provide mechanisms each including the film feed rollers 30, 40 and the film pull-out rollers 50, 60 in correspondence to the respective inlets 24, and to operate only the rollers 30, 40, 50, 60 corresponding to the inlet 24 from which the trash is put in.

Figure 6:
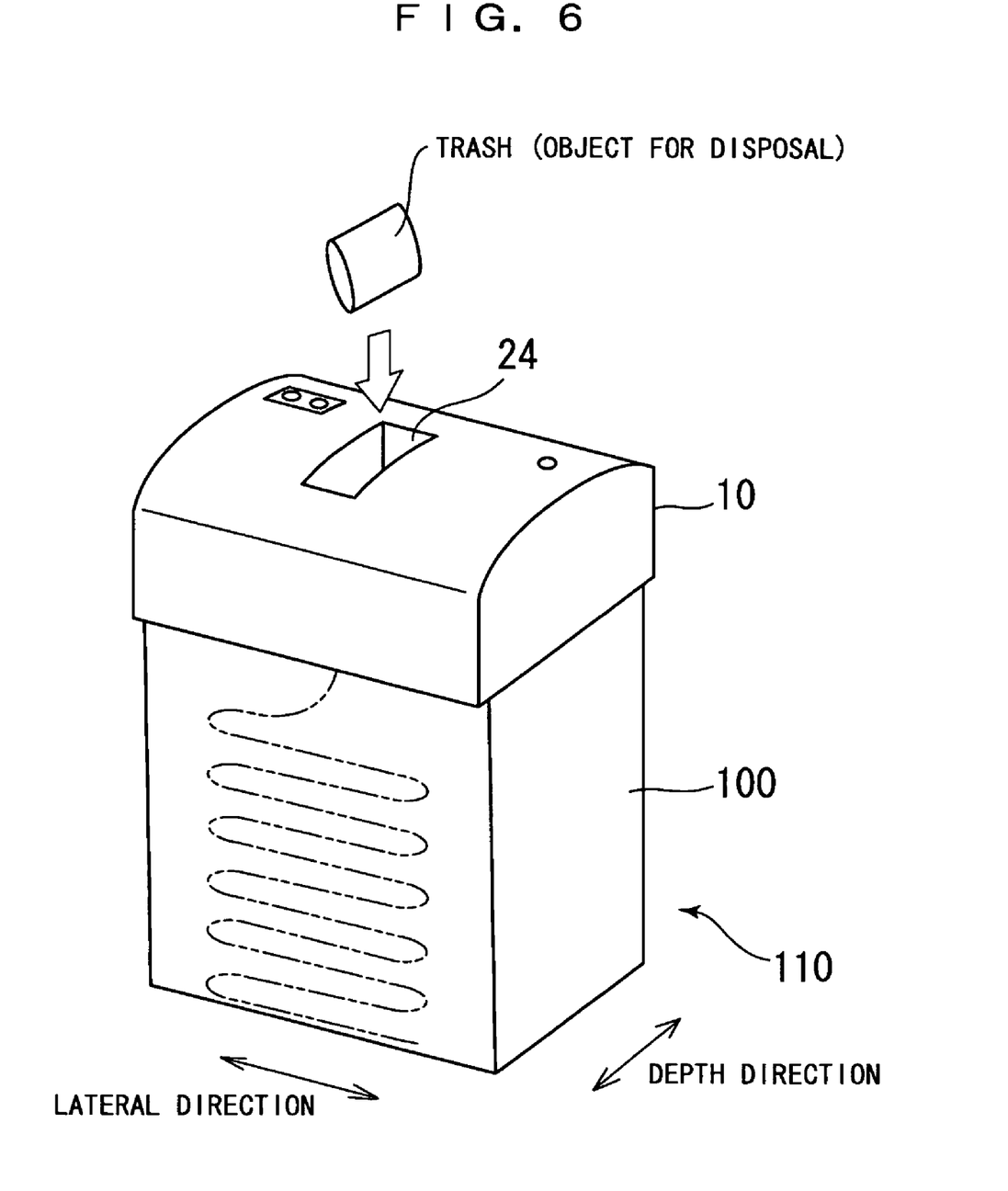
FIG. 6 is a view showing a thin-type trash box in which an inlet is formed in a depth direction.

Alternatively, as shown in FIG. 6, the trash storage part 100 is formed in a thin shape whose lateral length is long and whose length in a depth direction perpendicular to the lateral direction is shorter than the lateral length, the trash inlet 24 is formed to be long in the depth direction, and the film feed rollers 30, 40 and the film pull-out rollers 50, 60 are arranged so that their longitudinal direction matches the depth direction. Further, the length in the depth direction of the inside of the trash storage part 100 is set substantially equal to the width of the films fed from the film feed rollers 30, 40. This enables efficient storage since trashes stored in the trash storage part 100 are restricted by inner walls of the trash storage part 100 facing each other in the depth direction and are continuously folded along the lateral direction of the trash storage part 100 as shown by the imaginary line in FIG. 6. In particular, in a case where trashes of substantially the same size are put in, for example, in a case of a trash box (sanitary container) installed in each booth of a toilet for storing women's sanitary napkins and the like, the size of the trashes put therein is almost fixed, and therefore, thus limiting the size of the trash storage part 100 makes it possible to provide a trash box which can maintain its trash storage amount at a predetermined level or higher in spite of its thin shape, and which is suitably installed in a narrow installation space such as a toilet booth.

The above description shows the example where the packaging device 10 is attached to the trash box and the present invention is suitable for application to a trash box, but it should be noted that the present invention is also applicable to, for example, automatic packing of food and the like in a sealed manner.

The invention claimed is:

1. A trash box comprising a trash storage part storing a trash; and a packaging device disposed on an upper side of said trash storage part, wherein said packaging device comprises:

a frame member having an inlet through which an object for disposal is deposited;

two film feed rollers roatably provided in said frame member to be parallel to each other and to be a predetermined distance apart from each other;

two film pull-out rollers provided in said frame member, rotating to pull out films from said respective film feed rollers, and arranged in parallel to each other, with circumferential surfaces thereof being in contact with each other via the pulled films in a normal state; and a driving part rotating said film pull-out rollers, wherein the film rolled around at least one of said film feed rollers is an adhesive film having an adhesive layer formed on a whole surface facing the other film, wherein at least one of said film pull-out rollers includes a circumferential surface that is elastically deformed along a shape of the object for disposal when the object for disposal passes between said film pull-out rollers, and wherein, when the object for disposal is received between said film feed rollers and the film pull-out rollers rotate by being driven by said driving part, at least one of said film pull-out rollers is elastically deformed due to the object for disposal, and when the object for disposal passes between the film pull-out rollers, portions of the films around the object for disposal come into close contact with each other and a plurality of the objects for disposals each being in a sealingly packed state are continuously stored in said trash storage part, and by a pulling force that is generated by the film pull-out rollers when the fill pull-out rollers are driven by said driving part, a new object for disposal individually sealingly packed is stored so as to be pushed against the objects for disposal already stored in the individually sealingly packed state in the trash storage part.

2. The trash box according to claim 1, wherein a width of said trash storage part along a longitudinal direction of the film feed rollers is substantially equal to a width of the films fed from the film feed rollers.

3. The trash box according to claim 1, wherein said driving parts are provided in correspondence to said film pull-out rollers respectively, and said film pull-out rollers are rotary driven together by said driving parts.

4. The trash box according to claim 1, wherein said at least one film pull-out roller including the circumferential surface that is elastically deformed in accordance with the passage of the object for disposal includes sponge or rubber supported by a rotary shaft.

5. The trash box according to claim 1, wherein, in the normal state, said film pull-out rollers are biased by an elastic member in approaching directions, and when a load with a predetermined magnitude or larger works in a direction so as to make said film pull-out rollers apart from each other, at least one of said film pull-out rollers becomes apart from the other.

6. The trash box according to claim 1, further comprising a detecting means for detecting whether or not the object for disposal is positioned between the pulled films in a space between said film feed rollers and said film pull-out rollers, wherein, when detecting the object for disposal, said detecting means outputs a driving signal to the driving part rotating said film pull-out rollers.

7. The trash box according to claim 1, wherein two or more packaging devices and said trash storage parts are provided.

8. The trash box according to claim 1, wherein said packaging device has a plurality of the inlets, and said film rollers and said film pull-out rollers are provided in correspondence to each of the inlets.

* * * * *

UNITED STATES PATENT AND TRADEMARK OFFICE
CERTIFICATE OF CORRECTION

PATENT NO.         : 7,389,630 B2
APPLICATION NO. : 10/568640
DATED              : June 24, 2008
INVENTOR(S)        : Yoichi Nakano

It is certified that error appears in the above-identified patent and that said Letters Patent is hereby corrected as shown below:

On the title page, item [73] Assignee should read as follows:

-- (73) Assignee: Kyoritsu Seiyaku Corporation, Tokyo (JP) --

Signed and Sealed this

Sixteenth Day of June, 2009

JOHN DOLL
*Acting Director of the United States Patent and Trademark Office*